Patented Aug. 9, 1932

1,870,972

UNITED STATES PATENT OFFICE

MAX JOSEPH THEUMANN, OF LYON, FRANCE, ASSIGNOR TO E. I. DU PONT DE NEMOURS & COMPANY, OF WILMINGTON, DELAWARE, A CORPORATION OF DELAWARE

CELLULOSE COMPOSITIONS OF MATTER

No Drawing. Application filed January 24, 1930, Serial No. 423,266, and in France May 21, 1929.

This invention relates to compositions of matter having cellulose derivatives as their bases. More particularly, it relates to compositions of matter having cellulose derivatives, such as the ethers or esters, as their bases associated with a plasticizer and a fireproofing agent, said compositions being adapted to be employed in the manufacture of flexible products, such as films, pellicles, varnishes, artificial threads and filaments, or masses analogous to celluloid.

Prior to this invention, numerous compounds have been added to cellulose derivatives to render them non-inflammable and supple. Tri-phenyl phosphate and tri-cresyl phosphate or mixtures thereof have been quite extensively used for this purpose. These compounds, however, possessed several disadvantages. When used alone they were incapable of being absorbed by all types of cellulose acetate. Compounded with acetates having a high percentage of combined acetic acid, as for example more than 54%, there resulted products of reduced inflammability characteristics. When associated in amounts of from 20% to 25% with cellulose acetates having a combined acetic acid content less than 53% and after standing some time, they exuded from the mass and formed crystalline efflorescences. To avoid this disadvantage it was necessary to reduce the percentage of the tri-phenyl and/or tri-cresyl phosphate used or to use these compounds in combination with other plasticizers incapable of rendering the final product fireproof. Thus, the degree of the incombustibility or fireproofness of the product was reduced or diminished.

I have found that I can overcome the above-mentioned defects by using or employing tri-resorcinol phosphate also termed tri-m-oxyphenyl phosphate as a plasticizer and fireproofing agent in compositions containing a cellulose derivative, such as an ether or ester, and produce products having the desired characteristics of fireproofness and/or non-inflammability as well as pliability and suppleness.

Tri-resorcinol phosphate or tri-m-oxyphenyl phosphate has the following structural formula:

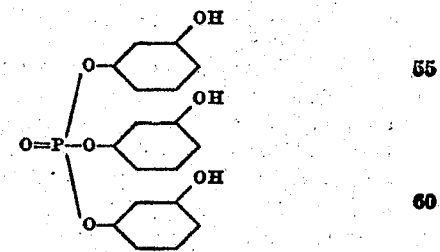

It is prepared by heating resorcinol with an excess amount of phosphorous pentachloride and treating the product with water.

Beilstein, Handbuch der Organische Chemie, 4th edit. Literature up to January 1, 1910, inclusive, Berlin—Julius Sprunger—1923, volume 6, p. 819, refers to this substance as folloys: "Phosphoric-Tris-(3-oxyphenol)-ester, Tris-(3-oxy-phenyl)-phosphate."

It is therefore an object of this invention to provide a composition of matter containing a cellulose derivative and tri-resorcinol phosphate or tri-m-oxyphenyl phosphate as a plasticizer and fireproofing agent.

Another object of this invention is to provide a plasticizer and fireproofing agent capable of being used with all cellulose acetates including those having a combined acetic acid content of less than 53% without exuding therefrom on standing.

Other objects will appear from the following description and appended claims.

According to one modification of this invention, tri-resorcinol phosphate or tri-m-oxyphenyl phosphate is associated with cellulose derivatives in the production of compositions of matter capable of being manufactured into flexible, non-inflammable and/or fireproof products, such as films, pellicles, varnishes, artificial threads and filaments, or masses analogous to celluloid. The cellulose derivative may be the ether or ester or combinations thereof including the alkly, aryl or aralkyl celluloses, cellulose nitrate, cellulose monoacetobutyrate and analogous compounds.

Various proportions of the compound may be used. I have found that, if the tri-resorcinol phosphate or tri-m-oxyphenyl phosphate is used in the percentages ranging from 10% to 32% based on the cellulose derivative, satisfactory results are obtained.

In order to more clearly explain the invention, the following specific examples are set forth. It is to be understood that the invention is not restricted thereto, since it is obvious that various changes in the manipulative steps and/or ingredients may be made without departing from the nature or spirit of the invention.

*Example I.*—A solution is obtained by dissolving 175 grams of cellulose acetate suitable for the manufacture of films and 45 grams of tri-resorcinol phosphate or tri-m-oxyphenyl phosphate in 750 grams of acetone. The solution thus produced is filtered, if necessary, and cast in the usual manner, that is, spreading or flowing it on a polished surface and permitting the acetone to evaporate. Subsequent to the evaporation of the solvent, the film is stripped from the support and dried.

A film produced in this manner is supple and possesses all the characteristics of non-inflammability. The plasticizer and fireproofing agent do not exude from the mass, even when the film is subjected to the variations of the hygrometric state or of temperature.

*Example II.*—A homogeneous mass is obtained by kneading 75 kilograms of cellulose acetate having a combined acetic acid content of approximately 52% with 24 kilograms of tri-resorcinol phosphate or tri-m-oxyphenyl phosphate and 50 kilograms of acetone. This mass may be subsequently treated in the usual manner for the preparation of celluloid-like articles.

The article produced according to the above process is non-inflammable and relatively stable. The tri-resorcinol phosphate or tri-m-oxyphenyl phosphate does not exude from the mass even after standing for a substantial period of time.

*Example III.*—13 kilograms of cellulose monoacetobutyrate or cellulose diacetomonobutyrate and 3.250 kilograms of tri-resorcinol phosphate or tri-m-oxyphenyl phosphate are dissolved in a mixture of 90 liters of chloroform and 10 liters of ethyl alcohol. This solution, after filtration (if necessary), is cast on suitable supporting surfaces as is well known in the art. After evaporation of the solvent the film is stripped from said support and dried in the usual manner. The film is strong, pliable and non-combustible.

*Example IV.*—A solution is produced by dissolving 12 kilograms of ethyl cellulose and 3 kilograms of tri-resorcinol phosphate or tri-m-oxyphenyl phosphate in a mixture of 60 liters of benzene and 40 liters of ethyl alcohol. After filtration, if necessary, films are produced in the usual manner, as described above.

The films produced from this solution are pliable, strong and burn with difficulty.

*Example V.*—15 kilograms of nitrocellulose and 1.5 kilograms of tri-resorcinol phosphate or tri-m-oxyphenyl phosphate are dissolved in a mixture of 80 liters of acetone and 20 liters of alcohol. The solution thus obtained may be used in a varnish or in the preparation of films.

In the preparation of the compositions and products above described, other plasticizers may be used in conjunction with the tri-resorcinol phosphate or tri-m-oxyphenyl phosphate. This, of course, depends on the flexibility desired in the final product and the amount of tri-resorcinol phosphate to be added.

From the above it is obvious that I have prepared a new composition of matter which comprises a cellulose derivative and tri-resorcinol phosphate or tri-m-oxyphenyl phosphate. This composition is non-inflammable and/or fireproof, supple, flexible, pliant and relatively stable. Thus, the plasticizer and fireproofing agent do not exude from the product even under changes of the hygrometric state or temperature. Tri-resorcinol phosphate or tri-m-oxyphenyl phosphate is capable of being used with the various cellulose acetates including those having combined acetic acid contents less than 53% without exuding therefrom.

Though the invention has been described above particularly with respect to cellulose derivatives, it is apparent that the tri-resorcinol phosphate or tri-m-oxyphenyl phosphate may be used with other materials, particularly those in which it is desired that the final product possess the characteristics of non-inflammability and/or fireproofness as well as pliability and flexibility.

Since it is obvious that various changes in the specific details above set forth may be made by one skilled in the art without departing from the nature or spirit of this invention, the latter is not restricted thereto except as set forth in the appended claims.

I claim:

1. A composition of matter comprising a cellulose derivative and tri-m-oxyphenyl phosphate as a plasticizer and fireproofing agent.

2. A composition of matter comprising a cellulose ester and tri-m-oxyphenyl phosphate as a plasticizer and fireproofing agent.

3. A composition of matter comprising cellulose acetate and tri-m-oxyphenyl phosphate as a plasticizer and fireproofing agent.

4. A composition of matter comprising cellulose acetate having a combined acid content less than 53% and tri-m-oxyphenyl phosphate as a plasticizer and fireproofing agent.

5. A composition of matter comprising a cellulose derivative and 10% to 32% of tri-m-oxyphenyl phosphate, the percentages being based on said cellulose derivative.

6. A composition of matter comprising cellulose acetate and 25% to 32% of tri-m-oxyphenyl phosphate, the percentages being based on said cellulose acetate.

In testimony whereof, I have affixed my signature to this specification.

MAX JOSEPH THEUMANN.